April 21, 1942.  A. SPOCK  2,280,316
SKID CHAIN APPLYING TOOL
Filed May 1, 1941
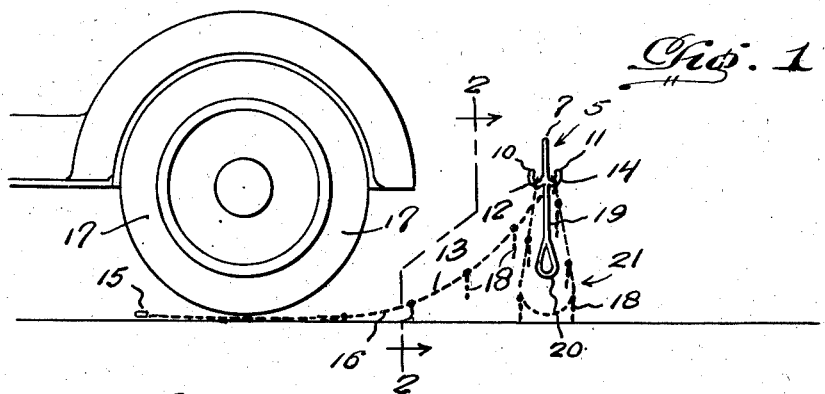
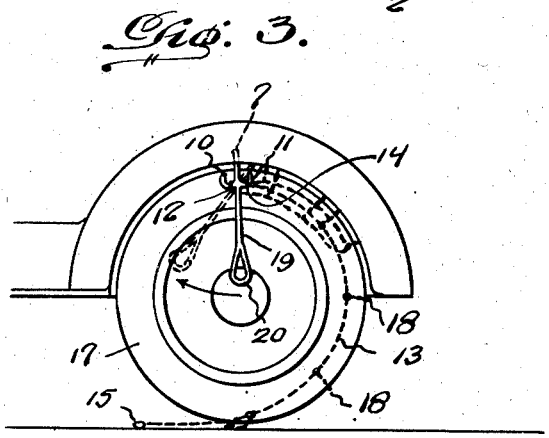
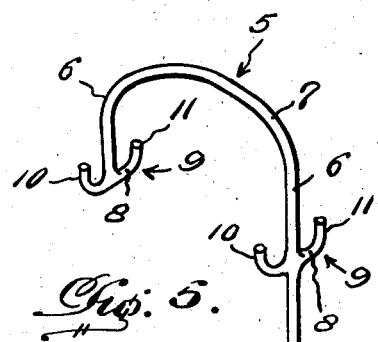
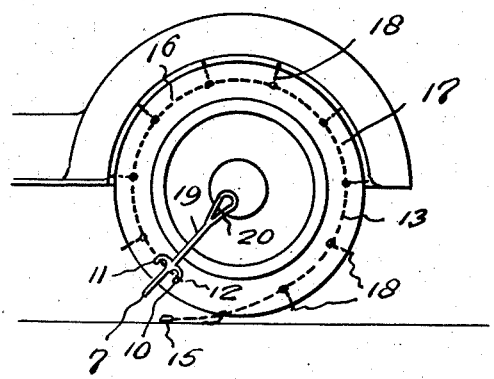
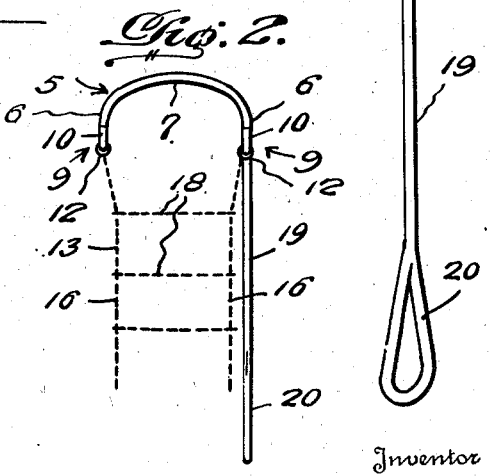
Inventor
Andrew Spock,
By McMorrow & Berman
Attorneys Patented Apr. 21, 1942

2,280,316

UNITED STATES PATENT OFFICE 2,280,316

SKID CHAIN APPLYING TOOL

Andrew Spock, Weatherly, Pa.

Application May 1, 1941, Serial No. 391,386

1 Claim. (Cl. 81—15.8)

My invention relates to skid chain applying tools and is a continuation in part of my pending application Serial No. 380,364, filed February 24, 1941.

One of the principal objects of my invention is to provide a tool of the foregoing described character which is so constructed and arranged as to facilitate the application of skid chains to the tires of motor vehicle wheels or the like and in a manner to eliminate the necessity of jacking or raising of the wheels above the roadway.

Another object of my invention is to provide a device of the foregoing described character equipped with means whereby an appreciable portion of the skid chain may be initially applied about the tire thus accelerating the application of the chain and preclude so-called "dragging" of the chain in mud, snow or the like during said application.

A further object of my invention is to provide a device of the above described character equipped with means whereby the tool may be conveniently held in the hand of the operator during application of the chain to the tire and in a manner to preclude contact of the operator's hand or clothing with the tire and thus prevent soiling of the hands or clothing by the tire.

An important object of my invention is to provide a device of the character described which is simple in construction, durable in use, efficient in operation and economical in manufacture.

Other objects and advantages will be apparent from the following description, appended claim and annexed drawing.

Referring to the drawing wherein like reference characters designate like parts throughout the several views:

Figure 1 is a side elevation of my invention and illustrating a skid chain attached thereto and in position for application about the tire of a vehicle wheel.

Figure 2 is an end elevation of my invention.

Figures 3 and 4 are side elevations respectively of my invention and depicting steps in the application of the chain to the tire.

Figure 5 is a perspective view of the tool.

In practising my invention, as illustrated in the drawing, I provide a tire chain applying tool comprising a substantially U-shaped member 5 formed with a pair of side rods 6 having oppositely disposed ends structurally integrally connected together by an arciform cross-bar or zygon 7. The other or free ends of the side rods 6 are structurally integrally connected to the central portions 8 of a pair of hangers 9, each of said hangers 9 being formed with a pair of oppositely or forwardly and rearwardly disposed hooks 10 and 11 respectively.

The hooks 10 are adapted to receive thereon chain links 12 carried on coincident ends of a skid chain 13 while the hooks 11 are adapted to receive oppositely disposed links 14, the latter being positioned an appreciable distance from the links 12 and interjacent the ends of the chain. The opposite ends of the chain 13 are provided with the usual fastening elements 15 coacting with the links 12 to secure the lateral runs 16 of the chain about the tire 17, said chain 13 being provided with a plurality of transverse runs 18 for overlying the tread of the tire. Inasmuch as the chain 13 is of an ordinary construction and forms no part of the present invention per se a more detailed description of the same is not believed warranted.

The free end of one of the rods 6 axially extends an appreciable distance beyond the respective hanger 9 and constitutes a handle 19, the latter being formed with a loop 20 at its free end to provide a hand grip as clearly illustrated in Figure 5 of the drawing. The loop 20 is also employed as a support whereby the tool may be suspended from a nail or the like when not in use.

In operation the skid chain 13 is spread flatwise on the roadway and the tire 16 disposed over one end thereof by a reverse operation of the motor vehicle. When the chain is thus disposed, the links 12, in the distal ends of the lateral runs, are disposed over the hooks 10 and the links 14 over the hooks 11 thereby providing an appreciable portion of the chain 13 with a sag 21 between the links 12 and 14 as clearly illustrated in Figure 1. When the chain is thus connected to the tool, the latter is moved over and about the tire to train the sag 21 and the adjacent portions of the chain about the tread as clearly illustrated in full lines in Figure 3. The hand grip or loop 20 of the tool is then moved forwardly (in the direction indicated by the arrow) to the dotted line position to effect sufficient tilting of the hangers 9 to release the links 14 from the hooks 11. When the links 14 are released from the hooks 11, the tool is moved a further distance about the tire to eliminate slack between the links 12 and 14 whereupon, upon release of the links 12 from the hooks 10 and removal of the tool from about the tire, the ends of the chain are connected together by the elements 15 in the usual manner.

From the foregoing, it will be apparent that

I have provided a simple and efficient form of skid chain applying tool whereby a chain may be conveniently and expeditiously applied to a tire and without the necessity of raising or jacking the tire with respect to the roadway.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claim.

What I claim is:

In a non-skid chain applying tool, a substantially U-shaped member to straddle a tire transversely thereof while mounted on a wheel of a motor vehicle for free circumferential movement of the tire and includes a substantially arcuately curved connecting portion and parallel straight side portions spaced from each other to move freely relative to the side walls of the tire, pairs of hooks formed on the straight side portions of the substantially U-shaped member, one pair of said hooks located on one side of the substantially U-shaped member to engage links at one end of a non-skid chain resting on the ground with the tire resting thereon a limited distance from the other end of the non-skid chain and the other pair of hooks being engaged with links of the non-skid chain located between the ends of the non-skid chain whereby a portion of the non-skid chain becomes draped on the substantially U-shaped member when manually supported, and an elongated straight handle having one end integral with the end of one of the side portions positioning said handle in alignment with the last-named side portion whereby a person gripping said handle may move the substantially U-shaped member circumferentially of the tire carrying the non-skid chain therewith about the tire with the major portion of the non-skid chain supported from the ground.

ANDREW SPOCK.